May 9, 1967 P. F. VARADI 3,318,149
GAS CHROMATOGRAPHY SYSTEM
Original Filed April 3, 1962 3 Sheets-Sheet 1

INVENTOR
PETER F. VARADI
BY Lawrence F. Benjamin
AGENT

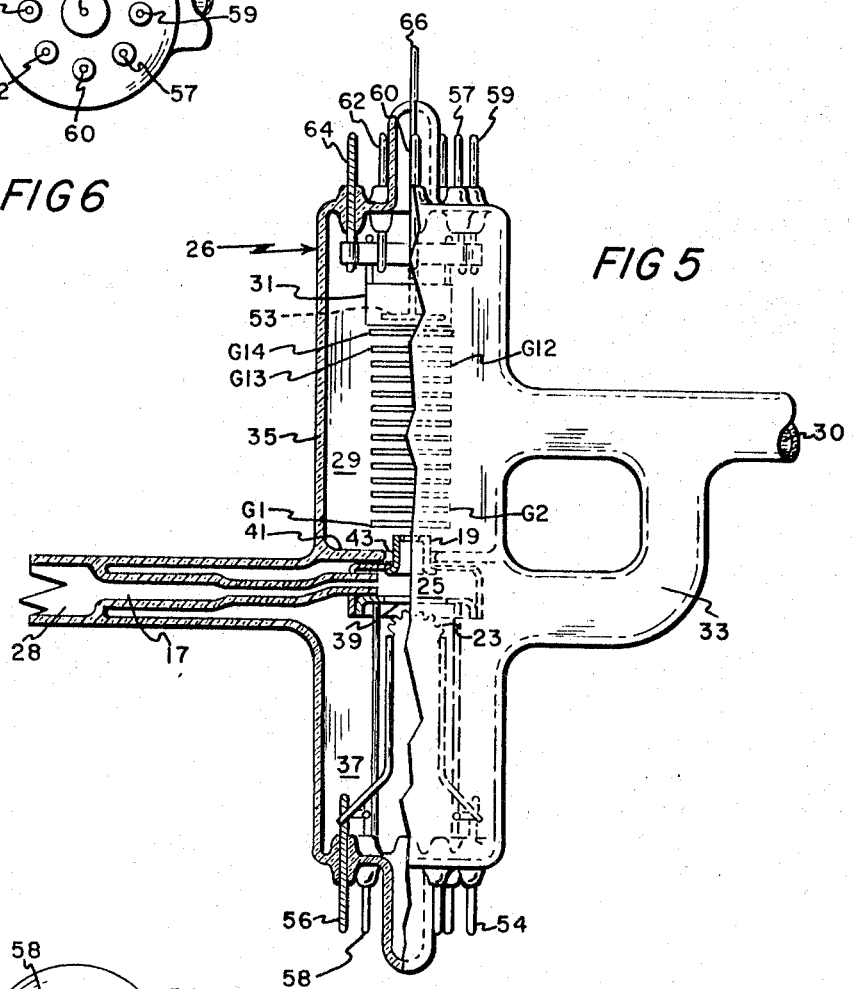
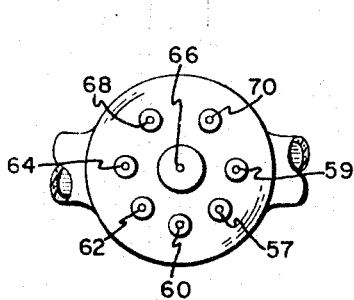
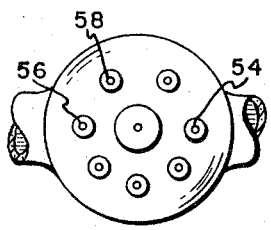

3,318,149
GAS CHROMATOGRAPHY SYSTEM
Peter F. Varadi, 1435 Bedford St.,
Stamford, Conn. 06905
Continuation of application Ser. No. 184,881, Apr. 3, 1962. This application Sept. 30, 1965, Ser. No. 498,191
3 Claims. (Cl. 73—23.1)

This invention is a continuing application of the invention filed on Apr. 3, 1962, under Ser. No. 184,881.

This invention relates to a chromatography system and, more particularly, to a system for the simultaneous quantitative and qualitative analysis by gas chromatography.

Gas chromatography is a method for the separation and quantitative determination of components of a gas mixture.

The present practice is to separate the components of the mixture into discreet packets or plugs of individual components and then quantitatively analyze each packet. To do this, a carrier gas, usually an inert gas such as helium, hydrogen, nitrogen, argon, and combinations thereof, is caused to flow through a tube at a known pressure, volume, and velocity. A relatively small quantity of the gas sample to be analyzed is injected into the stream, where it is picked up by the flowing carrier gas and continues flowing along with the carrier gas at the same velocity but as a discreet plug of material. The sample is then swept by the carrier gas through a column where an operation is performed on the plug which is similar in many respects to the chemical process known as fractionation. That is, the individual components that make up the mixture are retarded at different rates by the liquid or solid phase of the column. Thus, as the carrier gas continues to flow, the individually adsorbed components are picked up and put back into the stream. The net result is the individual components of the sample appear to migrate through the column at different speeds. Having now broken down the sample mixture into its component parts, the problem arises now to detect the separated components as they emerge in rapid succession from the column. This is done by a detector whose principal function is not to serve to identify the emerging components but, instead, to signal the presence of a foreign substance in the carrier gas; that is, to signal when the carrier gas is transporting foreign molecules and when it is not. One such detector relies on the fact that the electrical resistance of a heated wire varies with its temperature. Thus, a gas having a known flow rate and a constant composition and that passes over a heated wire will cool the wire a predetermined amount, thereby registering a given resistance. If, now, a gas of a somewhat different thermal conductivity were caused to pass over the wire, the temperature of the heated filament will change, thus changing the electrical resistance of the filament. This heated wire can be one leg of a Wheatstone bridge that is balanced during the presence of a carrier gas and will indicate an unbalance when anything else is mixed with the carrier gas.

Other methods of detection have been previously used in gas chromatography systems. At least two such devices rely on the change in the components of the gas being detected by a change in ionization and, hence, the electrical conductivity of the gas stream. In one device, the gas stream is ionized by being passed through a hydrogen flame, while in another such device, the gas stream is ionized by bombardment with radiation from a radioactive source.

However, one major drawback to this analytical technique is that no simple method is known for positively identifying the measured components. The most extensively used system for identification is based on some variation of retention time measurement. This method, however, is subject to possible errors from shifting or overlapping peaks and is, apparently, useless in cases where unexpected new peaks occur. In such cases, the identification procedure becomes more complex and, at this point, some other measuring technique such as infrared spectroscopy, for example, must be employed.

Recent attempts to solve the problem of positive identification of peaks is the use of a mass spectrometer in connection with a thermal conductivity cell or other known quantitative detector. In such systems, the gas is separated in the chromatographic column and caused to enter the quantitative detector, and a continuous sampling for the mass spectrometer is achieved through a capillary from the entrance port of the quantitative detector.

Mass spectrometers have proved to be valuable devices for positive identification of chromatographic peaks. However, such devices, particularly when used in combination with quantitatve detectors, are extremely expensive to build, to install, and to operate. Furthermore, such highly efficient devices as mass spectrometers are not always necessary, such as in cases where it is not required to qualitatively identify every peak. A major disadvantage of the combination of a conventional quantitative detector and a mass spectrometer or infrared spectrometer is that, between the quantitative analysis by the quantitative detector and the qualitative identification of a peak by a mass spectrometer or infrared spectrometer, a certain time elapses. This time delay is extremely disadvantageous in many applications. One example of such a case is in retention time calibration where a single positive identification of only one component in a mixture might serve as a reference to the relative retention time determination. The present invention has a built-in retention time "marker" which is extremely useful in routine analytical work to determine if any shifting occurs.

Another example of a case where mass spectrometers are required is in the identification of unknown peaks. Besides the positive identification of at least one component for relative retention time calibration purposes, the presently described device accomplishes the important task of identifying any new peaks occurring in the chromatogram. Still another example is in performing qualitative analyses of known peaks where the possibility exists of the overlapping of two or more components with the same retention time.

In accordance with this invention, gases or vapors which have been separated in a gas chromatographic column using helium as the carrier gas, are fed into the ionization chamber of a novel ion detector having a predetermined pressure therein of about $5 \times 10^{-4}$ torrs (mm. of mercury). The gas or vapor arriving in the detector is ionized by electrons in the specially designed chamber and the ions are attracted by a negatively charged electrode mounted in a second chamber. This negatively charged electrode is designed to trap only a part of the ions and the ion current measured on this electrode is related to the quantity of the gas component. The untrapped part of the ion beam is directed into a plane-parallel grid system which is a simple radio frequency mass-charge analyzer where the characteristic mass number of the gas component can be determined.

Accordingly, it is one of the primary objects of this invention to provide a novel system for performing quantitative measurements of gas components in a mixture thereof and simultaneously qualitatively identifying the component or components in the same gas sample.

Another object is to provide a system of the above character for detecting any shifting in the peaks of a chromatogram created during operation of the system.

Another object is to provide a system for quick and accurate identification of unknown peaks and of the components of overlapping peaks.

Another object is the provision of a system wherein the quality and quantity of noble gases as well as certain inorganic and organic gases of vapors can be measured directly after separation in a chromatographic column.

The features of my invention, which I believe to be novel, are set forth with particularity in the appended claims. My invention itself, however, both as to its organization and method of operation, together with further objects and advantages thereof, may be best understood by reference to the following description, taken in conjunction with the accompanying drawings in which:

FIG. 5 represents one embodiment depicting the physical relationship of the elements of the detector tube;

FIG. 6 represents a view of one end of the novel detector tube, and

FIG. 7 represents a view of another end of the novel detector tube.

Mass spectrometers are considered as ideal qualitative detectors for gas chromatography, but their use as quantitative detectors is not known. When mass spectrometers are used as qualitative detectors, one of the conventional quantitative detectors previously described is used in conjunction with the mass spectrometer in order to obtain quantitative data. This combination must be utilized because conventional mass spectrometers cannot be reasonably used for monitoring quantitative chromatographic peaks. This is understandable when it is considered that in an attempt to use a mass spectrometer as a quantitative detector, a quantitative peak can be determined only by plotting it from individual data obtained from a series of mass spectra.

Figure 1:
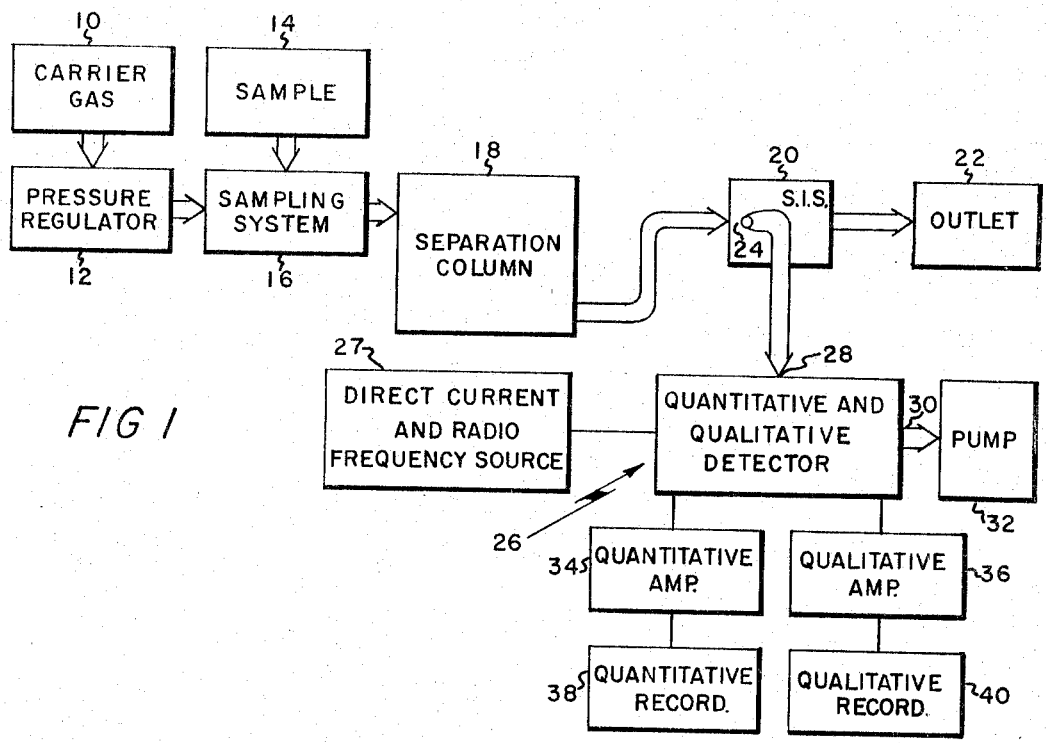
FIG. 1 represents a schematic illustration of the novel system.

Referring now to FIG. 1, this illustration schematically represents a novel system where both the quantitative and qualitative measurements are simultaneously performed on a single sample. The detector of this system utilizes a combined thermionic ionization device and a mass-to-charge analyzer to perform both measurements simultaneously within the same structure.

In my system, the carrier gas contained in cylinder 10 is conveyed to the pressure regulator device 12, which regulator determines both the quantity and the rate of flow of the carrier gas. A gas sample from container 14 is then injected into the carrier gas by means of the sampling system 16 which may be any one of many commonly used sampling valves. The carrier gas, containing at least one plug of the sample gas, is then passed to the separation column 18 where the individual components that make up the gas mixture of the sample are adsorbed at different rates, the net result being that, at the output of column 18, the individual components of the sample have migrated through the column at different speeds.

The gases separated in column 18 then enter the split inlet sampler (SIS) 20 where the major portion of the carrier gas containing the components is exhausted via outlet 22. In SIS 20, only the necessary amount of sample laden carrier gas at the required pressure is passed on to the thermionic ionization detector 26 via inlet port 28. Outlet port 30 is connected to vacuum pump 32 to pull the carrier gas and the sample components uniformly through the detector and to maintain the vacuum necessary for ionization. The output of the detector 26 is two electronic signals; one represents the quality and the other represents the quantity of the gas sample. These signals are passed respectively through quantitative amplifier 34 and thence to quantitative recording device 38, while the electrical signal from the qualitative portion of the detector 26 is passed respectively to qualitative amplifier 36 and thence to recording device 40, thus providing a permanent recording of the information detected in the detector 26.

While I have shown a permanent recording device for both qualitative and quantitative signals, it will be obvious to those skilled in the art that other devices, such as multiple oscilloscopes or a dual trace oscilloscope, may also be used in place of the recording devices indicated.

Figure 2:
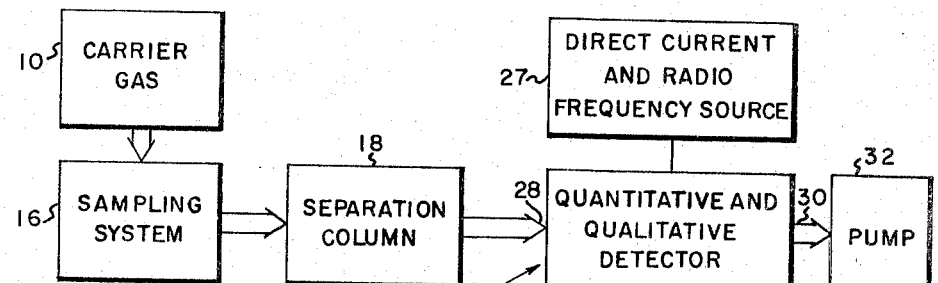
FIG. 2 represents a schematic illustration of another embodiment of my novel system.

Reference is now made to FIG. 2 which depicts another embodiment of my novel system wherein the gas chromatographic system of FIG. 1 is modified by combining a capillary-type column with my detector. The capillary column in this embodiment serves as a pressure reducer and contains the same stationary phase and functions as the previously shown separation column. Thus, it is no longer necessary to have the split inlet sample (SIS) or the pressure regulator and the separation column may now be connected directly to the quantitative and qualitative detector.

In this embodiment, the carrier gas contained in cylinder 10 is conveyed to the sampling system 16 into which the sample from container 14 may be injected via any one of many well known valves. The carrier gas now containing at least one plug of the sample gas is then passed directly into the separation column 18 which, in this instance, may be a capillary column. In the separation column 18, individual components that make up the sample are retarded at different rates by the liquid or solid phase of the column with the net result that, at the output of the separation column 18, the individual components have migrated through the column at different speeds.

The gases separated in the separation column 18 are then applied to the thermionic ionization detector 26 via inlet port 28. The outlet port 30 of detector 26 is connected to vacuum pump 32 to pull the carrier gas and the sample components uniformly through the detector and to also maintain the vacuum necessary for ionization. The output of detector 26 is two electronic signals; one representing the quality and one representing the quantity of sample gases. The quantitative signals are passed respectively through quantitative amplifier 34 and thence to a quantitative recording device 38, while the signals from the qualitative portion of detector 26 is passed respectively to qualitative amplifier 36 and thence to recording device 40. In both FIGS. 1 and 2, amplifiers 34 and 36 are shown as separate elements, but it will be obvious to those skilled in the art that it will be possible to combine the amplifier and recording units for each signal into one unit.

Here too, while permanent recording devices have been shown for both qualitative and quantitative signals, it will be obvious to those skilled in the art that other devices such as multiple oscilloscopes or multiple trace oscilloscopes may also be used in place of the recording devices shown here.

Figure 3:
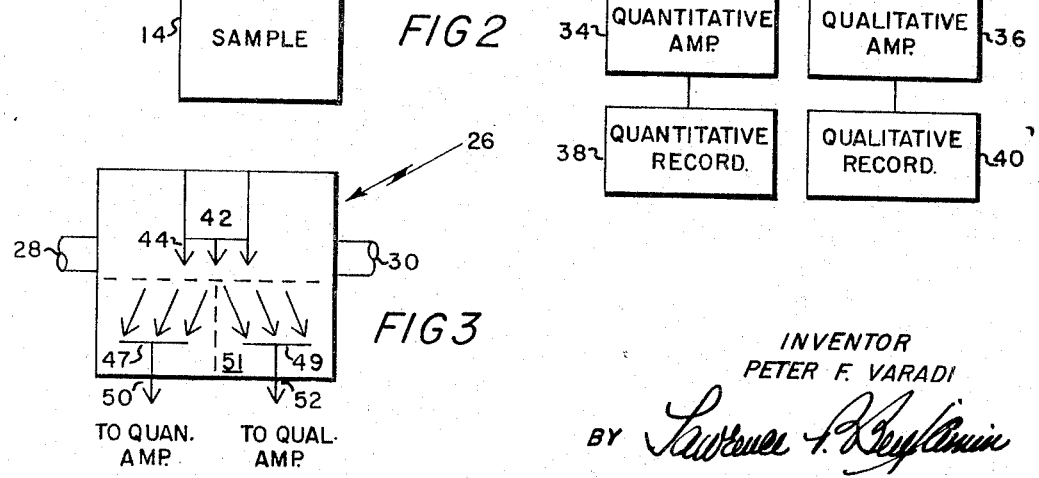
FIG. 3 represents a schematic illustration of a combined qualitative and quantitative detector.

To arrive at the separation of the qualitative and quantitative information which represents the output of detector 26, reference is made to FIG. 3 which shows inlet port 28 into which the carrier gas and sample components enter and outlet port 30 where the ionized gases exit to the vacuum pump 32 (FIG. 1). The gases or vapors that have been picked up by SIS 20 and the pitot or impact tube 24 are passed to inlet port 28, across cathode 42 which has been heated to the point of thermionic emission, and thence out to outlet port 30. As soon as the sample-laden carrier gas enters structure 26, the sample molecules are ionized by electrons 44, which electrons have been emitted from cathode 42. The positive ions 46 thus formed are normally collected at a collector electrode 47 and the resulting ion current may then be said to be related to the quantity of the sample in the carrier gas. The information, in the form of increased current, is applied via line 50, as an input to the quantitative amplifier. These signals may very easily be assimilated using well known calibration techniques.

In detector 26, however, only a portion of the ions formed in the ionization region of the device are trapped by the collector electrode 47. The remaining ions 48 enter area 51 in the detector 26 where a mass-to-charge analyzer (schematically indicated as electrode 49) is located. In this chamber, the necessary number of the ions, as determined by analyzer 49, is then utilized for the qualitative identification of the gas components. This information is in the form of an electrical signal which is electrically coupled to a qualitative amplifier 36 (FIG. 1) via connection 52. Thus, detector 26 functions to determine and present the quantitative and qualitative analysis simultaneously from a single sample.

MODE OF OPERATION

Figure 4:
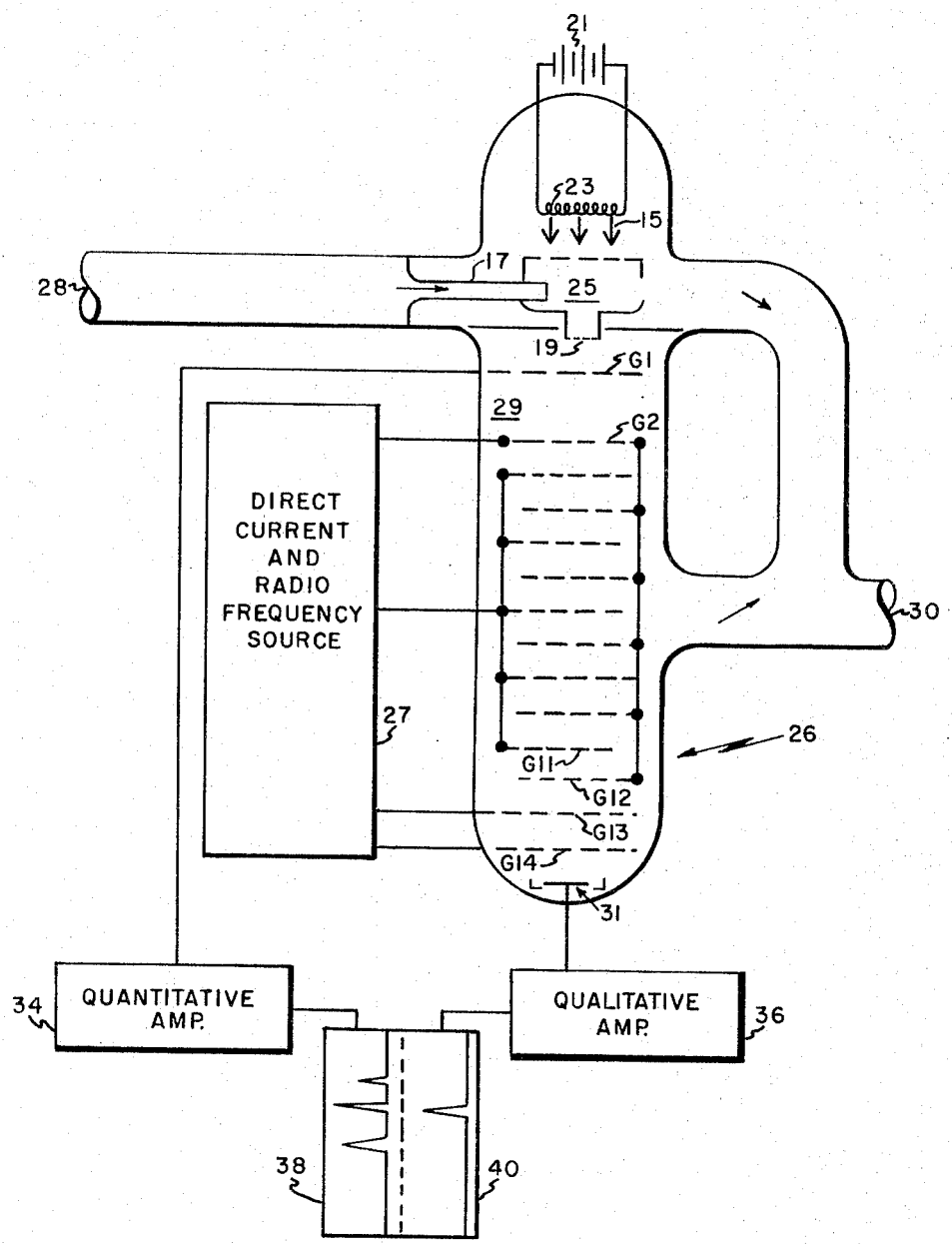
FIG. 4 represents a schematic illustration of the detector utilized in my system.

For a more detailed description of the operation of the detector system, reference is now made to FIG. 4 where the detector tube is shown schematically.

Quantitative detection

Basically, the detector tube is composed of two distinct chambers. Gases and/or vapors from either SIS 20, as shown in FIG. 1, or directly from separation column 18, as shown in FIG. 2, are fed into the interconnecting tubulation preceding the detector and are applied as an input through inlet port 28. The gases then proceed through tubulation 17 into the box-shaped electrode which consists of ion source 25 having a chimney 19 that extends into chamber 29. The ionizing-electric current, designated here by arrows 15 are supplied by a suitable emitter which has been heated to the point of thermionic emission by filament 23 and by source 21, which is here shown represented by a battery. While what shown here is a directly heated emitter, it will be obvious to those skilled in the art that the emitter may also be indirectly heated.

The electrons moving between filament 23 and electrode ion source 25 (which electrode defines the first chamber) ionizes a portion of the gases entering through tubulation 17. The portion of the gases that are not ionized here are then pumped out of the detector tube through outlet port 30 by means of pump 32 (FIGS. 1 and 2).

Positively charged ions produced by the accelerated electrons 15 pass through the chimney-shaped extension 19 of electrode ion source 25 where a portion of charged ions is attracted to grid G1, which is the first electrode in the second chamber (29) of the detector tube. Thus, that portion of the ions that is trapped on the first grid (G1) represents the ion current used for the quantitative determination of the chromatographic peaks.

In order to accurately perform a quantitative determination of a sample, yet maintain a high overall sensitivity in the system, it now becomes apparent that the detector must be relatively insensitive to the carrier gas and be highly sensitive to any other gas present in the sample. This can be achieved by using a carrier gas having a relatively high ionization potential and by setting the ionization voltage of the electrode ion source 25 to a value which is below the ionization potential of the carrier gas.

Another method would be to utilize any other suitable gas as a carrier, determine the ionization current attributable to the carrier gas and then subtract this current from the total ionization current detected by grid G1.

Qualitative detection

The ions produced by the ionization source, as previously described, are accelerated by electrons 15 to chamber 29 of the detector tube. The portion of the ions trapped at the negative grid G1 resulted in a current in this grid which is a measure of the quantity of the compound in the carrier gas. The remainder of the ions produced, those that are not trapped at G1, proceed therethrough into the analyzer system which consist of grids G2 to G12, respectively. Grids G2 to G12 of the analyzer system are equally spaced from each other and have the same order of magnitude of negative D.C. potential applied thereto from source 27. Grids G2 to G12 also have a radio frequency potential superimposed on the D.C. potential in such a manner that alternate grids have an RF potential of one polarity applied thereto while the remaining grids have an opposite potential applied thereto from source 27.

It is a known phenomenon that, at a given frequency, certain ions having a given mass will gain energy from the RF field while proceeding from G2 to G12. Others, having a different $e/M$ ratio, do not gain energy but, instead, lose energy. Therefore, if a retarding positive potential were applied to G13, all those ions that have not gained energy while proceeding from grid G2 through to G12 would be decelerated. Thus, the only ions which would be allowed to pass through grid G13 are those ions that, because of their particular mass, have gained energy. These ions which have gained energy are then accelerated by G14 (which has a high negative potential and is part of the shielding of collector electrode 31). The ion current collected at electrode 31 now represents those which have gained energy during transit. The relation between radio frequency, $f$ (in mc./sec.) and the mass number, M (AMU) of the selected ions may be explained by the equation:

$$M = K_0 \left( \frac{V}{S^2 f^2} \right) \quad (1)$$

where $K_0$ is a constant, V denotes the ion accelerating voltage in volts, and S denotes the grid distance in millimeters.

Identification of a molecular species emerging from the separation column might be made by either selecting a radio frequency corresponding to a characteristic mass number of the molecule (that is, its molecular weight) or, alternatively, a broad band of frequencies may be continuously scanned and the scanned frequencies applied to grids G2 to G12, or by maintaining the frequency constant and varying the accelerating voltage (V, Equation 1). Thus, it is possible to monitor the masses of all ionic fragments produced from the molecule. Since each molecular species has its own characteristic fragment ion pattern, this system may be readily used for a positive identification.

Having one reference mass ($M_0$), this equation, using the frequency scanning technique, may now be written as:

$$M_x = M_0 \left( \frac{f_0}{f_x} \right)^2 \quad (2)$$

where $M_0$ denotes the mass number of the reference ions, $f_0$ denotes the frequency at which the references ions appear, $M_x$ denotes the mass (AMU) of the unknown ion, and $f_x$ is the frequency at which the unknown peak occurs.

Retention time marker

The identification of a peak in a chromatography is simply done by comparing its retention time to a known sample. A retention time value, however, may shift from day to day or hour to hour, due to minor changes in flow rate, temperatures, etc. It thus becomes advisable to inject a known, pure sample into the system from time to time to check the exact retention time. The detector eliminates this time-consuming calibrating procedure. The quantitative part of the detector recorded each peak of the chromatogram on the quantitative recorder (FIGS. 1 and 2). The qualitative part was determined by applying a given frequency to G2 to G12 that was tuned to the characteristic mass number of a selected component, and only the appearance of this was monitored and recorded by the second pen of the recorder which is the qualitative recorder (FIGS. 1 and 2).

It should be here mentioned that because of the single detector unit, both the quantitative and qualitative peaks of a component appear simultaneously.

Identification of unknown peaks

Due to the very low ionizing energy utilized in the ion source of the detector tube, even complex organic molecules do not break down to a great number of different ionic fragments. Instead, the molecular ion and only a few but very characteristic ion-fragments are produced. The simplicity of the mass spectrum obtained is very helpful for fast identification of the compound. The mass numbers of the molecular ion and of all the ion-fragments to be measured by the detector system for many different frequently used and known compounds may be measured and tabulated.

The identification of an unknown chromatographic peak is then carried out by determining the molecular weight of the compound, and if further positive identification is necessary, the entire mass spectrum (ion-fragment pattern) is recorded.

The molecular weight of the compound is determined by tuning the qualitative part of the detector manually (scanning) over a wide frequency (i.e. mass) range, during the time when the quantitative part recorded the unknown peak. The mass number of the peak as compared to the highest mass number of the mass spectrum is then determined. It is known in the art that the highest mass number peak usually corresponds to the molecular weight of the material of one of the tested compounds.

If the determination of the retention time and of the highest mass number of the mass spectrum was for some reason insufficient for positive identification of the unknown quantitative peak, the entire mass spectrum is recorded. The recording of the mass spectrum is also made during the appearance of the questioned quantitative peak by scanning the qualitative part over a wide mass range. The scanning is performed by tuning the RF generator continuously over the desired frequency range by a motor. For example, the mass range of 15–120 AMU (5–2 mc./sec.), may be scanned in 45 seconds. The scanning speed can be increased, if necessary, and the mass spectrum can be displayed on the screen of an oscilloscope. It is also possible to have one pen of a two-pen recorder monitor the regular chromatogram which could be used for the standard quantitative evaluation, while the second pen records the scanned mass spectrum characteristic to the compound. Chromatograms were usually taken on a recorder paper travelling at a speed of about 21 mm./min. In cases when peak identifications were made by scanning, the evaluation of the mass spectrum was made easier by using a faster paper speed of about 210 mm./min.

For a detailed description of a representative configuration of a tube capable of operating in the previously described system, attention is directed to FIGS. 5, 6 and 7, which show one particular embodiment. Referring to FIG. 5, the quantitative and qualitative detector 26 is shown having an envelope 35 composed of chambers 29 and 37 which are separated by wall 41 having an aperture 43 therein. Tubulation 28 provides the inlet for the incoming sample and discharges the sample into chamber 37. Tubulation 33 and 30 provide the outlet for chambers 29 and 37, respectively. It should be noted that, while tubulation 17 is shown discharging the sample directly into the ion source 25, there are some instances where this particular tubulation is not necessary and may be eliminated. Instead, the incoming gas is discharged into chamber 37 which requires that ion generator 25 be formed with one or more apertures to allow for the passage of the sample therethrough. Filament 23 has the usual cathodic material associated therewith, and is heated to the point of thermionic emission by a source of voltage not shown. Adjacent filament 23 is ion source 25 having a lower mesh or grid 39 interposed between the remaining grids in the tube and filament 23. When a portion of the incoming sample has been ionized, as previously described, the now generated ions are accelerated and pass through chimney 19 into chamber 29. Chimney 19 is located in aperture 43 of wall 41, which wall separates chambers 29 and 37. The portion of chimney 19 adjacent grid G1 is also provided with a grid-like mesh. Once the ions are accelerated through chimney 19, the quantitative analysis is performed on G1, which grid terminates in one of the pins at the upper end of the figure in any one of many well known fashions. Proceeding on, there is found grids G2 through G14, which are arranged axially. These grids may be held in place by any one of many standard techniques, an example of which is the ceramic or glass support designed to hold the elements in alignment in a cathode ray tube. This supporting technique is well known and, hence, no exegesis is necessary.

As previously described, grids G2 through G12, inclusive, have RF applied thereto, which may be either a single frequency or a broad scanned band of frequencies. Grids G13 and G14 are next in line and constitute a means for decelerating these ions which have not gained energy (G13) and accelerating those ions which have gained energy (G14). Those ions which have been accelerated and pass G14 are collected at electrode 53 having a shield electrode 31 surrounding it. Electrodes 31 and 53 are the last electrodes in the axial row.

As shown in FIGS. 5, 6, and 7, pin connections 54, 56, and 58 are located at the ion generator end of the tube, while pins 56, 59, 60, 62, 64, 66, 68, and 70 are located at the ion collector electrode end of the tube. FIGS. 6 and 7 show a representative electrode-to-pin arrangement. In FIG. 6, pin 68, for example, may be connected to the even numbered grids G2, G4, G6, G8, G10, and G12, while pin 62 may be connected to grids G3, G5, G7, G9, and G11. Pins 64 and 59 may be connected to the ion collector shield electrode 31, while pin 66, shown as placed on the axis of the tube, may be connected to the ion collector 53. Pin 57 may be connected to grid G13, while pin 70 may be connected to grid G14.

In FIG. 7, pins 54 and 56 may, for example, be connected to the ends of filament 23, while pin 58 represents the connection to ion generator 25.

Neither the diameter of grids G1 through G14, inclusive, nor the intergrid spacing is critical. However, it has been found that optimum performance may be obtained by maintaining a uniform grid spacing and a uniform grid diameter. By way of example, it is suggested that the diameter of grids G1 through G14 and the diameter of the grid atop chimney 19 be in the ratio of about 3 to 1; that is, the diameter of the grids be maintained at least 3 times larger than the diameter of chimney 19. Chimney 19 may have an optimum inside diameter of about 4 mm. The spacing between the bottom of the chimney 19 and the grid 39 may be about 3 mm., while the spacing between the top of chimney 19 and grid G1 may range from between 1 to 7 mm., with the optimum spacing being about 3 mm. A spacing of about 2 mm. has been found satisfactory for the spacing between filament 23 and grid 39. The spacing between the individual grids G1 through G14 may vary between a minimum equal spacing of about 0.2 mm. and a maximum equal spacing of about 20 mm., with about 4 mm. being optimum, at pressures ranging from $5 \times 10^{-4}$ to $5 \times 10^{-7}$ mm. Hg.

The only other factor to be taken into consideration is the construction of the grid material being used in this tube. The grids may consist of either crossed wires or parallel wires. In the event that crossed wires in the form of a screen are used, an opening of about 0.5 mm. between crossed wires is suggested. Where parallel wires are used, the same 0.5 mm. spacing between wires should be maintained while in both instances, the grid wires should be of the order of 0.02 mm. in diameter. The prime consideration insofar as the grid material is concerned is that they be highly transparent between grids G1 and G14.

While I have described what is presently considered a preferred embodiment of my invention, it will be obvious to those skilled in the art that various changes and modifications may be made therein without departing from the inventive concept contained therein, and it is, therefore, aimed in the appended claims to cover all such changes and modifications as fall within the true spirit and scope of my invention.

What is claimed is:

1. In a system for chromatographic analysis comprising a carrier gas, a sample to be analyzed, a means of introducing the sample into the carrier gas, and a separation column; a single unitary detector means connected to the separation column, comprising an electron accelerating ionization source connected to an analyzing chamber, said analyzing chamber having a multiplicity of electrodes having at least one electrode to draw the ionized particles from said ionization source to the analyzing chamber and having one electrode positioned and charged to collect only a fragment of all ionic species simultaneously providing a quantitative signal of the components to a recording means, and said analyzing chamber having at least one electrically tunable $m/e$ separating electrode and a qualitative collector providing signal of the component to a recording means, a vacuum means connected to said detector to maintain vacuum in said detector means and the electronic accelerating voltage of said ionization source being less than the ionization potential of the carrier gas but being sufficient to ionize the sample contents.

2. The unitary detector means defined in claim 1 wherein the carrier gas is helium.

3. In a gas chromatograph having a capillary separation column for a carrier gas containing sample components, a mass spectrograph quantitative and qualitative analyzer comprising:

(A) an evacuated ionization chamber connected to receive the entire output of the capillary separation column, said chamber comprising electron accelerating means, the energy of the electrons accelerated thereby being less than the ionization potential of said carrier gas but sufficiently high to ionize said sample components;

(B) tunable mass separation means for separating by species a first portion of the ions from said ionization chamber;

(C) a qualitative detector electrode for detecting each of said species;

(D) a quantitative electrode for receiving a second portion of the ions from said ionization chamber before separation and for detecting the overall quantity thereof; and (E) pump means connected to exhaust the un-ionized carrier gas from said ionization chamber.

References Cited by the Examiner

FOREIGN PATENTS 1,071,983 12/1959 Germany.
869,936 6/1961 Great Britain.

OTHER REFERENCES

Article: R.F. Mass-Spectrometer, P. F. Varadi, L. G. Sebestyen, published in Hungarian Chemical Journal, June 1955, pages 176–182.

Diels et al.: "A New High Frequency Mass Spectrometer and Its Use in High Vacuum Technology," published in 1958, 5th National Symposium on Vacuum Technology Transactions, Pergamon Press, N.Y., pages 115, 116, 117.

Shutze and Varadi: "Gas Analysis of Rapid Phenomenon by Mass Spectrometry," Advance in Vacuum Science and Technology, Proceedings of 1st Int. Congr. on Vacuum Technology, June 1958, volume 1, Pergamon Press, N.Y., pages 125–133.

Design of G. C. Golay Column, R. D. Condon, published in Analytical Chemistry, vol. 31, No. 10, October 1959, pp. 1717–1722.

RICHARD C. QUEISSER, *Primary Examiner.*